(12) United States Patent
Poursartip et al.

(10) Patent No.: US 9,727,912 B1
(45) Date of Patent: Aug. 8, 2017

(54) APPROACHES FOR MERCHANT FINANCING

(71) Applicant: Square, Inc., San Francisco, CA (US)

(72) Inventors: Ariana Poursartip, San Francisco, CA (US); John Bryan Scott, San Francisco, CA (US); Kevin Teh, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 14/491,967

(22) Filed: Sep. 19, 2014

Related U.S. Application Data

(60) Provisional application No. 62/002,996, filed on May 26, 2014.

(51) Int. Cl.
  *G06Q 40/02* (2012.01)
  *G06Q 20/20* (2012.01)
  *G06Q 40/00* (2012.01)

(52) U.S. Cl.
  CPC .......... *G06Q 40/025* (2013.01); *G06Q 20/20* (2013.01)

(58) Field of Classification Search
  USPC ........................................................ 705/16
  See application file for complete search history.

(56) References Cited

U.S. PATENT DOCUMENTS

| | | |
|---|---|---|
| 6,167,385 A | 12/2000 | Hartley-Urquhart |
| 6,941,281 B1 | 9/2005 | Johnson |
| 7,181,427 B1 | 2/2007 | DeFrancesco et al. |
| 7,353,203 B1 | 4/2008 | Kriplani et al. |
| 7,953,653 B2 | 5/2011 | Siggers et al. |
| 8,219,335 B2 | 7/2012 | Marti et al. |
| 8,239,227 B2 | 8/2012 | Megiddo et al. |
| 8,666,847 B1 | 3/2014 | Blank et al. |

(Continued)

FOREIGN PATENT DOCUMENTS

| | | |
|---|---|---|
| EP | 2 466 322 A1 | 6/2012 |
| WO | 99/03076 A1 | 1/1999 |
| WO | 2012/150985 A1 | 11/2012 |

OTHER PUBLICATIONS

Advisory Action mailed Jul. 27, 2015, for U.S. Appl. No. 14/491,958, of Poursartip, A., et al., filed Sep. 19, 2014.

(Continued)

*Primary Examiner* — Garcia Ade
(74) *Attorney, Agent, or Firm* — Mattingly & Malur, PC

(57) ABSTRACT

A payment system can determine whether a merchant is eligible for a cash advance for a particular amount, along with a fee for the cash advance. The particular amount can be determined by evaluating previous financial transactions that were conducted by the merchant through the payment system. Once a determination is made that the merchant is eligible for the cash advance, the payment system can send an offer for the cash advance in the particular amount to the merchant, for example, in the form of an e-mail or text. The merchant can accept the offer for the cash advance by sending an acceptance to the payment system, for example, through a financing interface provided by the payment system. Upon accepting the offer, the merchant is provided the cash advance for the particular amount, for example, in the form of an electronic deposit in a financial account of the merchant.

15 Claims, 8 Drawing Sheets

(56) References Cited

U.S. PATENT DOCUMENTS

| | | | |
|---|---|---|---|
| 8,732,040 B1 | 5/2014 | Prabhune et al. | |
| 8,799,133 B2 | 8/2014 | Gula, IV | |
| 2002/0038277 A1 | 3/2002 | Yuan | |
| 2002/0161558 A1 | 10/2002 | Georges et al. | |
| 2002/0174061 A1 | 11/2002 | Srinivasan et al. | |
| 2003/0101107 A1 | 5/2003 | Agarwal et al. | |
| 2004/0054625 A1 | 3/2004 | Kellogg et al. | |
| 2004/0064398 A1* | 4/2004 | Browne | G06Q 40/04 705/37 |
| 2004/0193540 A1 | 9/2004 | Brown et al. | |
| 2006/0095350 A1 | 5/2006 | Hall et al. | |
| 2007/0117601 A1 | 5/2007 | Van Luchene | |
| 2007/0156579 A1 | 7/2007 | Manesh | |
| 2007/0156584 A1 | 7/2007 | Barnes et al. | |
| 2007/0174191 A1 | 7/2007 | Keaton et al. | |
| 2007/0255635 A1* | 11/2007 | Multer | G06Q 40/00 705/36 R |
| 2007/0255653 A1 | 11/2007 | Tumminaro et al. | |
| 2008/0033825 A1 | 2/2008 | Goldin | |
| 2008/0052229 A1 | 2/2008 | Sheinker et al. | |
| 2008/0109348 A1 | 5/2008 | Saxena et al. | |
| 2008/0154769 A1 | 6/2008 | Anderson et al. | |
| 2009/0043697 A1 | 2/2009 | Jacobs et al. | |
| 2010/0032308 A1 | 2/2010 | Qi et al. | |
| 2010/0228651 A1 | 9/2010 | Becerra et al. | |
| 2010/0268667 A1 | 10/2010 | King et al. | |
| 2010/0299251 A1 | 11/2010 | Thomas | |
| 2010/0306071 A1 | 12/2010 | Kay | |
| 2011/0055056 A1 | 3/2011 | Kwatinetz | |
| 2011/0202445 A1 | 8/2011 | Torres | |
| 2011/0251870 A1 | 10/2011 | Tavares et al. | |
| 2012/0011071 A1 | 1/2012 | Pennock et al. | |
| 2012/0022945 A1 | 1/2012 | Falkenborg et al. | |
| 2012/0054097 A1 | 3/2012 | Frohwein et al. | |
| 2012/0066033 A1 | 3/2012 | Frohwein et al. | |
| 2012/0089436 A1 | 4/2012 | Tavares et al. | |
| 2012/0143649 A1 | 6/2012 | Aubertin | |
| 2012/0191525 A1 | 7/2012 | Singh et al. | |
| 2012/0209734 A1 | 8/2012 | Brooks et al. | |
| 2012/0226595 A1 | 9/2012 | Torres | |
| 2012/0233010 A1 | 9/2012 | Frohwein et al. | |
| 2012/0233090 A1 | 9/2012 | Tavares et al. | |
| 2012/0239552 A1 | 9/2012 | Harycki | |
| 2012/0271765 A1 | 10/2012 | Cervenka et al. | |
| 2013/0054484 A1 | 2/2013 | Hoeflinger et al. | |
| 2013/0085804 A1 | 4/2013 | Leff et al. | |
| 2013/0124432 A1 | 5/2013 | Thibodeau | |
| 2013/0138544 A1 | 5/2013 | Chapman | |
| 2013/0185228 A1 | 7/2013 | Dresner et al. | |
| 2013/0204664 A1 | 8/2013 | Romagnolo et al. | |
| 2013/0226688 A1 | 8/2013 | Harvilicz et al. | |
| 2013/0268417 A1 | 10/2013 | Sgueglia | |
| 2013/0332265 A1 | 12/2013 | Sossaman, II et al. | |
| 2014/0006202 A1 | 1/2014 | Frohwein et al. | |
| 2014/0025473 A1 | 1/2014 | Cohen | |
| 2014/0032298 A1 | 1/2014 | Corrie et al. | |
| 2014/0032307 A1 | 1/2014 | Corrie et al. | |
| 2014/0032308 A1 | 1/2014 | Corrie et al. | |
| 2014/0032309 A1 | 1/2014 | Corrie et al. | |
| 2014/0032310 A1 | 1/2014 | Corrie et al. | |
| 2014/0040157 A1 | 2/2014 | Cohen et al. | |
| 2014/0052668 A1 | 2/2014 | Cameron | |
| 2014/0058804 A1 | 2/2014 | Zhou et al. | |
| 2014/0143120 A1 | 5/2014 | Clarke et al. | |
| 2014/0143124 A1 | 5/2014 | Sanders | |
| 2014/0143405 A1 | 5/2014 | Pavlidis et al. | |
| 2014/0164049 A1 | 6/2014 | Yakos et al. | |
| 2014/0171039 A1 | 6/2014 | Bjontegard | |
| 2014/0229397 A1 | 8/2014 | Fink | |
| 2014/0244361 A1 | 8/2014 | Zhang et al. | |
| 2014/0244486 A1 | 8/2014 | Abril | |
| 2014/0279682 A1 | 9/2014 | Feldman | |
| 2014/0304137 A1 | 10/2014 | Olson et al. | |
| 2014/0316823 A1 | 10/2014 | Cooper | |
| 2014/0344037 A1 | 11/2014 | Dunbar et al. | |
| 2014/0351116 A1 | 11/2014 | Hoff | |
| 2014/0358766 A1 | 12/2014 | Nayyar et al. | |
| 2015/0039490 A1 | 2/2015 | Forrester et al. | |
| 2015/0100475 A1 | 4/2015 | Cummings et al. | |
| 2015/0149333 A1 | 5/2015 | Yaplee et al. | |
| 2015/0161606 A1 | 6/2015 | Lee | |
| 2015/0168478 A1 | 6/2015 | Öhlen et al. | |
| 2015/0170286 A1 | 6/2015 | Gingell et al. | |

OTHER PUBLICATIONS

Non-Final Office Action mailed Aug. 27, 2015, for U.S. Appl. No. 14/675,127, of Shearer, D. J., et al., filed Mar. 31, 2015.
Non-Final Office Action mailed on Oct. 8, 2015, for U.S. Appl. No. 14/167,931, of Brock, Z., et al., filed Jan. 29, 2014.
Final Office Action mailed on Nov. 6, 2015, for U.S. Appl. No. 14/491,965, of Poursartip, A., et al., filed Sep. 19, 2014.
Non-Final Office Action mailed on Jan. 5, 2016, for U.S. Appl. No. 14/491,958, of Poursartip, A., et al., filed Sep. 19, 2014.
Non-Final Office Action mailed on Apr. 27, 2016, for U.S. Appl. No. 14/616,515, of Boates, B., et al., filed Feb. 6, 2015.
Final Office Action mailed on May 12, 2016, for U.S. Appl. No. 14/167,931, of Brock, Z., et al., filed Jan. 29, 2014.
Non-Final Office Action mailed on Jun. 17, 2016, for U.S. Appl. No. 14/491,965, of Poursartip, A., et al., filed Sep. 19, 2014.
Non-Final Office Action mailed on Jun. 17, 2016, for U.S. Appl. No. 14/622,605, of Scott, J.B., et al., filed Feb. 13, 2015.
Final Office Action mailed on Aug. 3, 2016, for U.S. Appl. No. 14/663,209, of Boates, B., et al., filed Mar. 19, 2015.
Non-Final Office Action mailed Sep. 9, 2016, for U.S. Appl. No. 14/540,947, of Baker, G. K., filed Nov. 13, 2014.
Final Office Action mailed Oct. 7, 2016, for U.S. Appl. No. 14/675,257, of Shearer, D. J., et al., filed Mar. 31, 2015.
Non-Final Office Action mailed Nov. 3, 2016, for U.S. Appl. No. 14/675,127, of Shearer, D.J., et al., filed Mar. 31, 2015.
Non-Final Office Action mailed Nov. 28, 2016, for U.S. Appl. No. 14/491,963, of Poursartip, A., et al., filed Sep. 19, 2014.
Giusti, A.C.,"Want More Revenue? Enhance the Offers: Carefully matching merchants with the right products and ensuring agents know them well can dictate how much an ISO may earn from value-added services," ISO & Agent 7.4, dated May 1, 2011, pp. 2.
Leung, L, "PayPal ramps up small-business loans," The Orange County register, Journal—Gazette [Ft. Wayne, Ind], dated Feb. 10, 2014, pp. 2.
Non-Final Office Action mailed Dec. 19, 2016, for U.S. Appl. No. 14/491,965, of Poursartip, A., et al., filed Sep. 19, 2014.
Non-Final Office Action mailed Jan. 11, 2017, for U.S. Appl. No. 14/167,931, of Brock, Z., filed Jan. 29, 2014.
Examiner's Answer to Appeal Brief mailed Jan. 27, 2017, for U.S. Appl. No. 14/491,958, of Poursartip, A., et al., filed Sep. 19, 2014.
Non-Final Office Action mailed Feb. 10, 2017, for U.S. Appl. No. 14/622,605, of Scott, J.B., et al., filed Feb. 13, 2015.
Final Rejection mailed Feb. 17, 2017, for U.S. Appl. No. 14/616,515, of Boates, B., et al., filed Feb. 6, 2015.
International search report and written opinion, for PCT Application No. PCT/SE2013/051008, mailed Dec. 20, 2013.
U.S. Appl. No. 14/167,931, of Brock, Z., filed Jan. 29, 2014.
U.S. Appl. No. 14/491,958, of Poursartip, A., et al., filed Sep. 19, 2014.
U.S. Appl. No. 14/491,963, of Poursartip, A., et al., filed Sep. 19, 2014.
U.S. Appl. No. 14/491,965, of Poursartip, A., et al., filed Sep. 19, 2014.
U.S. Appl. No. 14/602,486, of Fern, A.J., et al., filed Jan. 22, 2015.
U.S. Appl. No. 14/616,515, of Boates, B., et al., filed Feb. 6, 2015.
U.S. Appl. No. 14/616,520, of Boates, B., et al., filed Feb. 6, 2015.
U.S. Appl. No. 14/622,605, of Scott, J.B., et al., filed Feb. 13, 2015.
U.S. Appl. No. 14/633,209, of Boates, D.J., et al., filed Mar. 19, 2015.
U.S. Appl. No. 14/675,127, of Shearer, D.J., et al., filed Mar. 31, 2015.
U.S. Appl. No. 14/675,257, of Shearer, D.J., et al., filed Mar. 31, 2015.

(56) References Cited

OTHER PUBLICATIONS

U.S. Appl. No. 14/676,678, of Scott, J.B., et al., filed Apr. 1, 2015.
Non-Final Office Action mailed on Jan. 8, 2015, for U.S. Appl. No. 14/491,958, of Poursartip, A., et al., filed Sep. 19, 2014.
Non-Final Office Action mailed on Mar. 27, 2015, for U.S. Appl. No. 14/491,965, of Poursartip, A., et al., filed Sep. 19, 2014.
Restriction Requirement mailed on May 7, 2015, for U.S. Appl. No. 14/167,931, of Brock Z., filed Jan. 29, 2014.
Final Office Action mailed on May 20, 2015, for U.S. Appl. No. 14/491,958, of Poursartip, A., et al., filed Sep. 19, 2014.
Non-Final Office Action mailed on Aug. 27, 2015, for U.S. Appl. No. 14/540,947, of Baker, G. K., et al., filed Nov. 13, 2014.
Non-Final Office Action mailed on Jan. 13, 2016, for U.S. Appl. No. 14/663,209, of Boates, B., et al., filed Mar. 19, 2015.
Non-Final Office Action mailed on Jan. 21, 2016, for U.S. Appl. No. 14/675,257, of Shearer, D. J., et al., filed Mar. 31, 2015.
Non-Final Office Action mailed on Feb. 12, 2016, for U.S. Appl. No. 14/540,947, of Baker, G. K., et al., filed Nov. 13, 2014.
Final Office Action mailed on Mar. 31, 2016, for U.S. Appl. No. 14/675,127, of Shearer, D. J., et al., filed Mar. 31, 2015.
Non-Final Office Action mailed Mar. 1, 2017, for U.S. Appl. No. 14/616,520, of Boates, B., et al., filed Feb. 6, 2015.
Final Office Action mailed on Apr. 6, 2017, for U.S. Appl. No. 14/540,947, of Baker, G.K., filed Nov. 13, 2014.
Final Office Action mailed Apr. 10, 2017, for U.S. Appl. No. 14/675,127, of Shearer, D.J., et al., filed Mar. 31, 2015.
"Oracle Retail Advanced Inventory Planning," www.oracle.com, pp. 1-2 (2013).
Barr, A., "Update 5—Amazon offering loans to its on line sellers," www.reuters.com, dated Sep. 27, 2012, Retrieved from the Internet URL: http://www.reuters.com/article/amazon-lending-idUSL1E8KRA1020120927?type=companyNews, on Jun. 1, 2017, pp. 1-4.
Non-Final Office Action mailed May 10, 2017, for U.S. Appl. No. 14/602,486, of Fern, A.J., et al., filed on Jan. 22, 2015.
Non-Final Office Action mailed May 16, 2017, for U.S. Appl. No. 14/676,678, of Scott, J.B., et al., filed on Apr. 1, 2015.
Notice of Allowance mailed on May 25, 2017, for U.S. Appl. No. 14/663,209, of Boates, B., et al., filed Mar. 19, 2015.
Notice of Allowance mailed May 31, 2017, for U.S. Appl. No. 14/675,257, of Shearer, D.J., et al., filed Mar. 31, 2015.
Notice of Allowance mailed Jun. 7, 2017, for U.S. Appl. No. 14/491,963, of Poursartip, A., et al., filed Sep. 19, 2014.
Notice of Allowance mailed on Jun. 22, 2017, for U.S. Appl. No. 14/540,947, of Baker, G.K., filed Nov. 13, 2014.

\* cited by examiner

APPROACHES FOR MERCHANT FINANCING

CROSS-REFERENCE TO RELATED APPLICATIONS

This application claims the benefit of U.S. Provisional Patent Application No. 62/002,996, entitled "APPROACHES FOR MERCHANT FINANCING", filed on May 26, 2014, and which is hereby expressly incorporated herein by reference in its entirety.

BACKGROUND

Individuals and businesses can approach financial institutions, e.g., banks, to request funds for various purposes. When requesting funds, an individual will typically fill out an application that provides the bank with the individual's personal and financial information. The bank will then evaluate the individual's application to make a decision on whether to approve the funds.

BRIEF DESCRIPTION OF THE DRAWINGS

In order to describe the manner in which features of the disclosure can be obtained, a more particular description of the principles will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
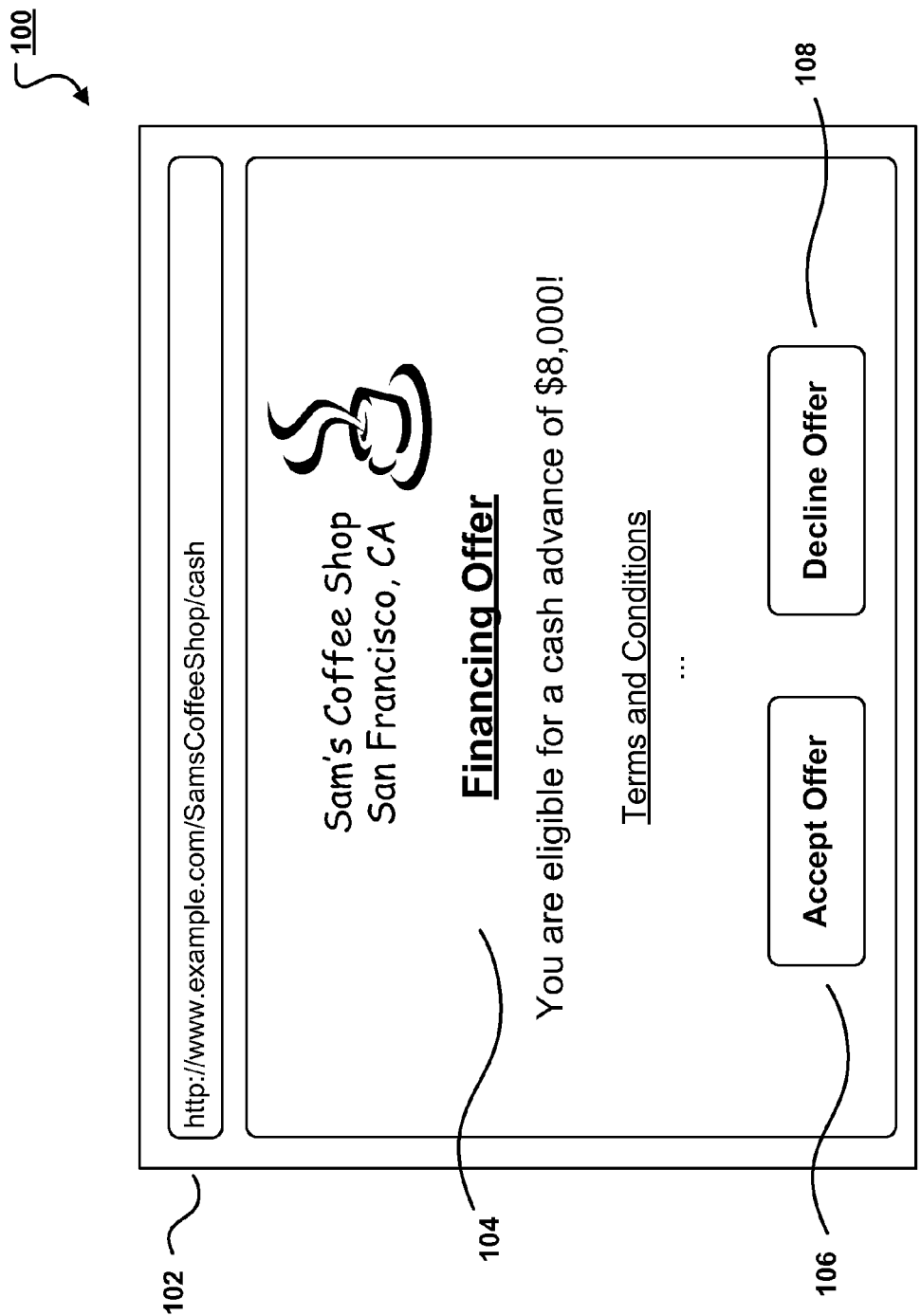
FIG. 1 illustrates an example view of an interface for offering financing to a merchant.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Systems and methods in accordance with various embodiments of the present disclosure overcome one or more of the above-referenced and other deficiencies in conventional approaches to providing financing, e.g., cash advances, to merchants. In particular, various embodiments of the present disclosure can provide a method for evaluating financial transactions conducted by a merchant through a payment system and, based on the evaluation, providing the merchant with one or more offers of cash advances. The determination of whether a merchant qualifies for a financing offer can be based entirely on an evaluation of the merchant's previously conducted financial transactions through the payment system. In other words, the merchant need not complete applications for requesting the cash advance or provide a credit check. For example, over the previous year, the merchant may have conducted financial transactions through the payment system that total $100,000 in payment volume. Based on this payment volume and various other factors associated with the merchant, a determination can be made to offer the merchant a cash advance of $8,000 and an $800 fee for the cash advance being offered.

Thus, the merchant would receive a cash advance of $8,000 and would have to pay back the merchant financing system, e.g., the payment system, a total amount of $8,800, i.e., the $8,000 cash advance and the $800 fee. This amount can be collected by the payment system as a fraction of the amounts collected by the merchant from future financial transactions conducted through the payment system. To accept the offer, the merchant can select an option, for example, through a financing interface provided by the payment system. Once the offer is accepted, the merchant can be provided the cash advance through an electronic deposit made by the payment system in a financial account of the merchant in a financial institution.

After the cash advance is disbursed, each time the merchant conducts a financial transaction through the payment system, the payment system will deduct a specified percentage, e.g., 10 percent, from the amount charged in the financial transaction. For example, if the merchant conducts a financial transaction in the amount of $50.00, then, while processing the financial transaction, the payment system will automatically deduct $5.00, and apply that amount to the amount owed by the merchant, i.e., $8,800. In other words, at a rate of 10 percent, the merchant will be done repaying the amount owed once the merchant has reached $88,000 in financial transactions conducted through the payment system. In some embodiments, the payment system can be configured to deduct the rate of repayment, e.g., 10 percent, from a group of financial transactions conducted by the merchant through the payment system over a particular period of time, e.g., daily, weekly, bi-weekly, monthly, or yearly.

The approaches described in this specification can allow merchants to obtain financing without having to go through a typical loan application process. Merchants can also obtain financing in a timelier manner than having to fill out loan applications and obtain funding upon successful completion of the loan process. Other advantages, variations, and functions are described and suggested below as may be provided in accordance with the various embodiments.

FIG. 1 illustrates an example view 100 of an interface 102 for offering financing to a merchant. The interface 102 is a graphical user interface that can be displayed on a display screen of a computing device that is being operated by a merchant ("Sam's Coffee Shop"). For example, the computing device, e.g., the merchant device 304, can present the interface 102 through an application, e.g., a web browser or a merchant application, that is running on the computing device.

Some of the information presented in the interface 102 can be generated by a merchant financing system, e.g., the merchant financing system 308. The merchant financing system is configured to determine whether the merchant qualifies for a financing offer, e.g., a cash advance, by evaluating various factors associated with the merchant, as described below. Some of these factors can be based, in part, on evaluating financial transactions conducted by the merchant through a payment system, e.g., the payment system 312, as described in reference to FIG. 3. As described below, the payment system is configured to process financial transactions between merchants and their customers. These financial transactions can be, for example, card-less payment transactions or transactions performed using financial payment instruments, e.g., credit cards, debit cards, or gift cards, to name some examples.

Once a determination is made that the merchant pre-qualifies for a financing offer, the details of the financing offer can be sent to the merchant. Depending on the implementation, the offer details can be sent to the computing device over a network, e.g., the Internet, through a web-based environment or may be sent to the merchant through electronic communication, e.g., by e-mail or a text message.

After receiving notification of the offer, the merchant can interact with the computing device, e.g., the merchant device 304, to access the interface 102 and learn more about the offer details. For example, the interface 102 may be accessible to the merchant over the Internet and through a secure Uniform Resource Locator (URL). In this example, the merchant can access the URL through a web browser to learn more about the financing offer. Similarly, the interface 102 may be accessible to the merchant through a software application, e.g., the merchant application, that is running on the computing device.

The interface 102 provides the merchant with information about the financing offer. For example, the interface 102 can provide an amount of financing 104 that is being offered to the merchant. As mentioned, this amount can be determined based in part on evaluating the merchant's previous financial transactions that were processed through the payment system. For example, the merchant financing system may determine that the merchant qualifies for a cash advance of $8,000. This offer can be presented to the merchant through the interface 102. The merchant financing system may also determine various terms and conditions for the offer. For example, the terms and conditions may specify that the merchant financing system will provide the merchant a cash advance of $8,000 and, in return, the merchant agrees to pay the merchant financing system a fee, e.g., a fixed fee of $1,000. Details regarding the repayment of the fee can also be provided in the terms and conditions.

The merchant can decide to accept or reject the financial offer by selecting an accept option 106 or a decline option 108, respectively. Once the accept option 106 is selected, in various embodiments, the merchant is provided the cash advance through an electronic deposit made by the payment system to the merchant's account with a financial institution. Other approaches to providing the merchant with the cash advance are possible including, for example, providing the merchant with a financial payment card having a pre-set spending limit in the amount of the cash advance.

In various embodiments, to charge the merchant for the cash advance amount and the fee, the payment system is configured to deduct a portion of the merchant's earnings from future sales, i.e., sales conducted through the payment system after acceptance of the financing offer, until the fee is repaid. For example, when the merchant conducts a financial transaction through the payment system, the payment system can deduct 10 percent from the amount collected by the merchant from the financial transaction. Depending on the implementation, the payment system can automatically deduct the 10 percent on a per-transaction basis, e.g., 10 percent is deducted from each financial transaction conducted by the merchant, until the fee is repaid to the merchant financing system. In some embodiments, the payment system automatically deducts 10 percent from a total amount collected by the merchant for financial transactions conducted by the merchant over a certain time period, e.g., hourly, daily, weekly, bi-weekly, monthly, or yearly. Typically, there is no set time period for repayment of the fee. However, a time period for repayment may be specified in the terms and conditions. Naturally, once the fee has been repaid to the merchant financing system, the payment system no longer deducts a portion of the merchant's earnings from its financial transactions.

Figure 2:
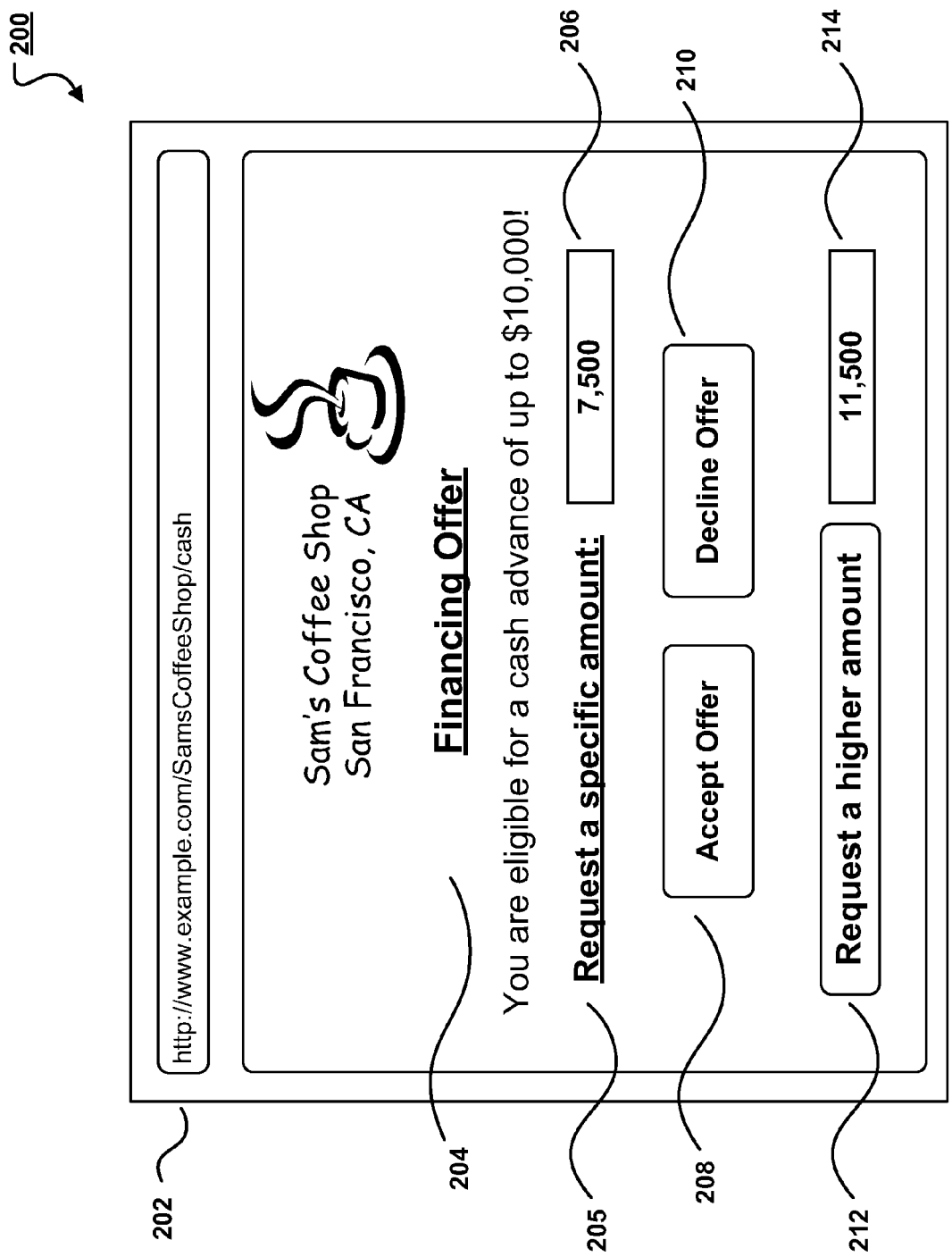
FIG. 2 illustrates another example view of an interface for offering financing to a merchant.

FIG. 2 illustrates another example view 200 of an interface 202 for offering financing to a merchant. The interface 202 is a graphical user interface that can be displayed on a display screen of a computing device that is being operated by a merchant ("Sam's Coffee Shop"). For example, the computing device, e.g., the merchant device 304, can present the interface 202 through an application, e.g., a web browser or a merchant application, that is running on the computing device.

The interface 202 contains information that can be generated by the merchant financing system, e.g., the merchant financing system 308, using the approaches described in this specification. As described above, the merchant financing system is configured to determine whether the merchant qualifies for a financing offer, e.g., a cash advance, by evaluating various factors associated with the merchant. Once a determination is made that the merchant qualifies for a financing offer, the details of the financing offer can be sent to the merchant, as described above.

After receiving notification of the offer, the merchant can interact with the computing device, e.g., the merchant device 304, to access the interface 202 and learn more about the offer details. For example, the interface 202 may be accessible to the merchant over the Internet and through a secure Uniform Resource Locator (URL). In this example, the merchant can access the URL through a web browser to learn more about the financing offer. Similarly, the interface 202 may be accessible to the merchant through a software application, e.g., the merchant application, that is running on the computing device.

The interface 202 provides the merchant with information about the financing offer. In some embodiments, this information includes a maximum amount 204 of financing that the merchant is pre-qualified to receive. As discussed, this amount can be determined based in part on evaluating the merchant's financial transactions that were processed through the payment system. For example, the merchant financing system may determine that the merchant qualifies for a cash advance of up to $10,000. This information can be presented to the merchant through the interface 202. In some embodiments, the merchant can simply select the accept option 208 to receive the entire amount of financing that the merchant is pre-qualified to receive.

In some instances, the merchant may not need the entire amount of financing being offered. Thus, in some embodiments, the merchant can request a specific amount of financing, e.g., $7,500, by inputting an amount of financing of up to the maximum amount being offered in an input field 206. Once inputted, the merchant financing system can provide adjusted terms and conditions with adjusted repayment details to be presented in the interface 202, including, for example, the amount of fee to be charged for the requested cash advance and percentage to be deducted from the merchant's financial transactions for repayment of that fee. If these adjusted terms and conditions, together with the repayment details, are agreeable to the merchant, then the merchant can select the accept option 208 button to accept the financing offer. In response, the merchant financing system can instruct the payment system to deposit the requested amount in the merchant's account with a financial institution. Other approaches to providing the requested amount can also be used, as described in this specification. As described above, the merchant financing system can instruct the payment system to deduct a portion of the merchant's earnings from future sales until the fee is repaid to the merchant financing system.

In some embodiments, the merchant can select an option 212 to request an amount of financing that is higher than the amount being offered. The merchant can input the higher requested amount in an input field 214. This requested amount can be provided to the merchant financing system, which can then evaluate various factors, e.g., the merchant's financial transaction history, to determine whether the merchant qualifies for the requested amount. If the merchant financing system approves the merchant's request for the higher amount of financing, adjusted terms and conditions for the higher amount can be presented in the interface 202, including, for example, an adjusted fee for the financing, an adjusted percentage to be deducted from financial transactions performed by the merchant, whether the deductions are done on a per-transaction basis or from financial transactions conducted by the merchant over a certain time period, e.g., hourly, daily, weekly, bi-weekly, monthly, or yearly. The adjusted terms may also specify a new time period for repayment may be specified in the terms and conditions. If these adjusted terms and conditions are agreeable to the merchant, then the merchant can select the accept option 208 button to accept the financing offer for the higher amount. In response, the merchant financing system can instruct the payment system to deposit the requested higher amount in the merchant's account with a financial institution. Other approaches to providing the requested amount can also be used, as described in this specification. As described above, the merchant financing system can instruct the payment system to deduct a portion of the merchant's earnings from future sales until the fee is repaid to the merchant financing system.

Figure 3:
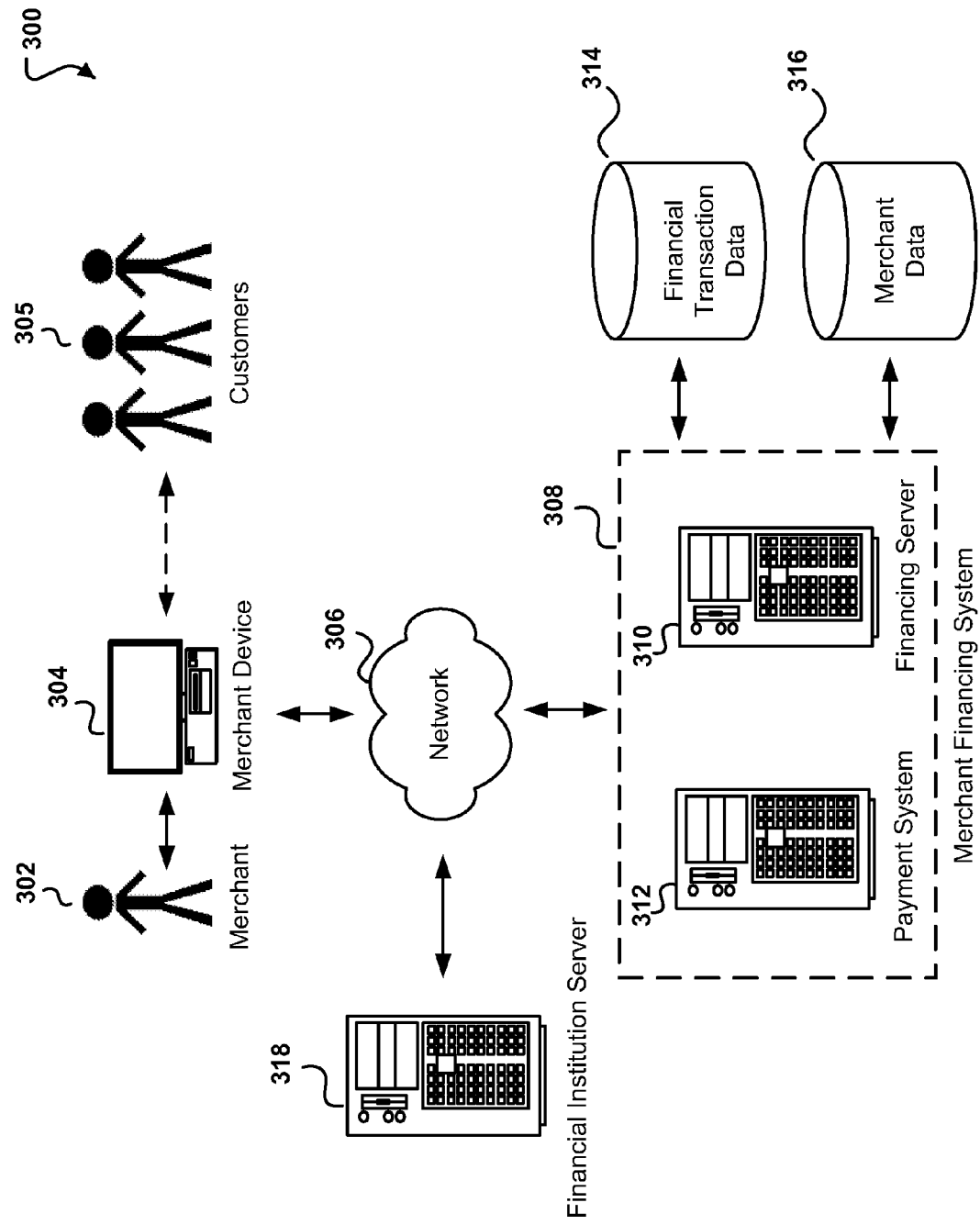
FIG. 3 illustrates an example of an environment for implementing a merchant financing system.

FIG. 3 illustrates an example of an environment 300 for implementing a merchant financing system 308. The exemplary environment 300 includes a merchant financing system 308. The merchant financing system 308 includes a financing server 310 and a payment server 312.

The financing server 310 can be implemented as computer programs on one or more computers in one or more locations, in which the systems, components, and techniques described in this specification can be implemented. The payment server 312 is configured to process financial transactions between the merchant 302 and its customers 305. These financial transactions can be, for example, card-less payment transactions or transactions performed using financial payment instruments, e.g., credit cards, debit cards, or gift cards, to name some examples. Further operation of the payment system 312 is described below in reference to FIG. 8. The example environment 300 also includes a merchant computing device 304 that can be used to conduct financial transactions, as described below in reference to FIG. 8.

The merchant device 304 can be a computer coupled to the merchant financing system 308 through a data communication network 306, e.g., the Internet. The merchant device 304 generally includes a memory, e.g., a random access memory (RAM), for storing instructions and data, and a processor for executing stored instructions. The merchant device 304 can include one or more components, e.g., software or hardware, that are operable to send and receive requests, messages, or other types of information over the network 306. Some examples of computing devices include personal computers, cellular phones, handheld messaging devices, laptop computers, personal data assistants, tablet devices, and the like.

The network 306 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The merchant device 304, and the merchant financing system 308 can communicate over the network 306 using wired or wireless connections, and combinations thereof.

The financing server 310 is configured to determine whether a merchant qualifies for a financing offer, e.g., a cash advance, by evaluating various factors associated with the merchant. Some of these factors can be based, in part, on evaluating financial transactions conducted by the merchant through the payment system 312.

The financing server 310 can determine whether a merchant is eligible for a financing offer, the amount of the cash advance, a fee for the cash advance, e.g., a percentage of the cash advance or a fixed fee, and a rate for repayment for the cash advance and the fee, i.e., a fixed amount or a percentage, to be deducted from financial transactions conducted by the merchant. These determinations can be made, for example, by applying various machine learning techniques, e.g., ensemble learning methods.

In various embodiments, the financial server 310 utilizes a classifier, for example, based on a random forest approach, to determine whether a merchant qualifies for a financing offer. The classifier can be trained using training data that describes, for various merchants, respective payment history, the respective type of business, a respective gross payment volume (GPV) over a particular time period, the growth of the merchant's GPV over a particular time period, e.g., month over month growth, and whether the merchant has a brick-and-mortar store, to name some examples.

To determine whether a particular merchant qualifies for a financing offer, the financing server 310 can utilize the classifier to determine whether factors describing the merchant qualify the merchant for a cash advance. As mentioned, these factors can be, for example, the merchant's payment history, the type of business, and a GPV over a particular time period, e.g., over the past fiscal quarter or year. The financing server 310 can also determine the amount of the financing offer, the fee for the financing offer, and the rate of repayment, using similar techniques. For example, the financing server 310 can apply normal regression analysis on the merchant's previous financial transactions conducted by the merchant through the payment system 312 to make such determinations. In some embodiments, the fee for the cash advance is based on a specified percentage, e.g., 14 percent, of the cash advance. In some embodiments, the rate of repayment is a specified percentage, e.g., 10 percent. In some embodiments, the rate is determined based on targeting a 10-month repayment model. This model can be determined by forecasting the merchant's GPV for the subsequent year.

Once the financing server 310 determines that the merchant qualifies for a financing offer, the details of the financing offer can be sent to the merchant. Depending on the implementation, the offer details can be sent to the computing device over a network, e.g., the Internet, through a web-based environment, as described above, or may be sent to the merchant through electronic communication, e.g., by e-mail or a text message.

The merchant can then accept the financing offer, as described above. Once the offer is accepted, the financing server 310 can instruct the payment system 312 to disburse funds, to the merchant, in the amount specified in the offer. The payment system 312 can access various merchant data 316 that describes financial account information, e.g., a routing number for a checking account, for the merchant. In some embodiments, the payment system 312 electronically deposits the funds in the merchant's financial account with a financial institution 318. The merchant can then access the funds directly from their financial account. Other approaches to providing the merchant with the cash advance are possible including, for example, providing the merchant with a financial payment card having a pre-set spending limit in the amount of the cash advance.

In some embodiments, the financing server 310 may determine that the merchant qualifies up to a maximum amount of financing. In such embodiments, the merchant can request an amount of financing that is the same or less than the maximum amount of financing. In some embodiments, the merchant may request an amount of financing that is higher than the amount of financing that the merchant was pre-qualified to receive. In such embodiments, the financing server 310, alone or in combination with human feedback, can evaluate the request to determine whether the merchant should receive the requested higher amount of financing.

The financing server 310 is configured to evaluate respective factors associated with merchants, as described above, to determine whether any of those merchants pre-qualify for respective financing offers. Naturally, the factors for each merchant will vary based on the different types of financial transactions performed by that merchant and the various attributes of the merchant. Thus, the financing server 310 is able to generate custom financing offers for each merchant. Financing offers for each merchant can be determined automatically without merchants necessarily requesting such offers. Once determined, these offers can be provided to the merchants, as described above, without the merchant having to request the cash advance.

The payment system 312 is configured to process financial transactions between the merchant 302 and customers 305, as described below in reference to FIG. 8. In various embodiments, while processing financial transactions for the merchant 302, the payment system 312 is also configured to deduct a portion of the merchant's earnings from these financial transactions until the amount of financing provided to the merchant, together with the fee for the financing, is collected by the payment system 312. As mentioned, the amount deducted from financial transactions can be based on a rate for repayment for the cash advance and the fee, as specified in the terms and conditions, i.e., a fixed amount deducted from each transaction, e.g., $5, or a percentage, e.g., 10 percent, to be deducted from financial transactions conducted by the merchant. As mentioned, these deductions can be performed on a per-transaction basis or from financial transactions conducted by the merchant over a certain time period, e.g., hourly, daily, weekly, bi-weekly, monthly, or yearly.

Figure 4:
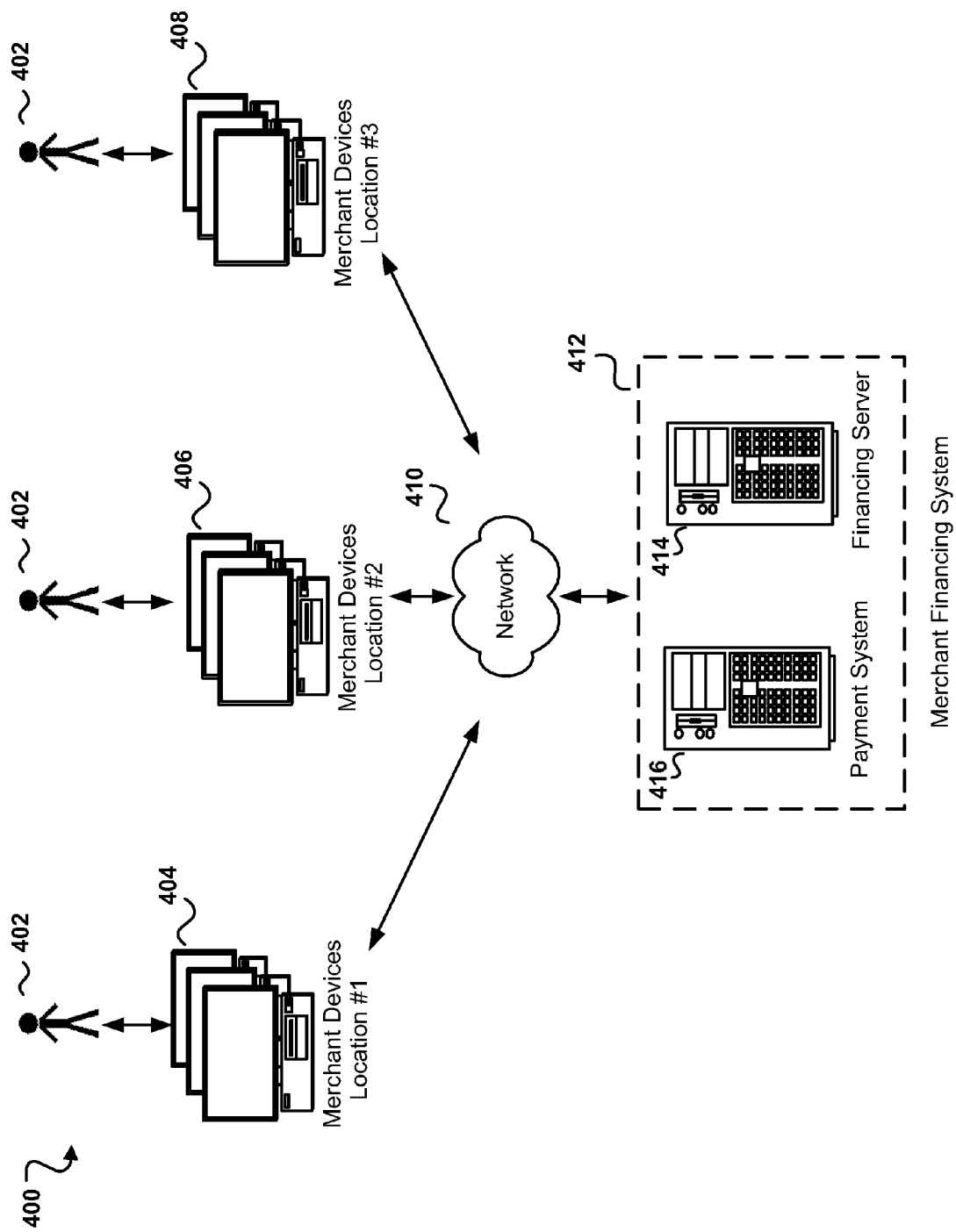
FIG. 4 illustrates an example of an environment for collecting repayment from multiple business locations of a merchant.

FIG. 4 illustrates an example of an environment 400 for collecting repayment from multiple business locations 404, 406, and 408 of a merchant 402. The exemplary environment 400 includes one or more merchant devices in a first business location 404 of the merchant 402, one or more merchant devices in a second business location 406 of the merchant 402, and one or more merchant devices in a third business location 408 of the merchant 402. Each merchant device is configured to conduct financial transactions through the payment system in the merchant financing system. The merchant financing system 412 includes a financing server 414 and a payment system 416. The merchant financing system 412 is configured to perform the operations of the merchant financing system 308, as described in reference to FIG. 3. Similarly, the financing server 414 and the payment system 416 are configured to respectively perform the operations of the financing server 310 and the payment system 312, as described in reference to FIG. 3.

As described, the merchant financing system 412 can determine whether a merchant is eligible for a financing offer, the amount of the cash advance, a fee for the cash advance, e.g., a percentage of the cash advance or a fixed fee, and a rate for repayment for the cash advance and the fee, i.e., a fixed amount or a percentage, to be deducted from financial transactions conducted by the merchant.

Once the merchant has received the cash advance, the merchant financing system 412 can begin collecting repayment of the cash advance and the fee associated with the cash advance. To collect payment of the cash advance and the fee, the payment system 416 is configured to process financial transactions conducted by the merchant 402 that received the cash advance through its merchant device. In various embodiments, while processing financial transactions for the merchant 402, the payment system 416 is also configured to deduct a portion of the merchant's earnings from these financial transactions until the amount of financing provided to the merchant, together with the fee for the financing, is collected by the payment system 416. As mentioned, the amount deducted from financial transactions can be based on a rate for repayment for the cash advance and the fee, as specified in the terms and conditions, i.e., a fixed amount deducted from each transaction, e.g., $5, or a percentage, e.g., 10 percent, to be deducted from financial transactions conducted by the merchant. These deductions can be performed on a per-transaction basis or from financial transactions conducted by the merchant over a certain time period, e.g., hourly, daily, weekly, bi-weekly, monthly, or yearly.

In some instances, a merchant may have multiple business locations 404, 406, 408, each business location having one or more merchant devices that are in operation. The merchant financing system 412 can be configured to process financial transactions for the merchant that are received from each merchant device at each business location 404, 406, and 408. The merchant financing system 412 can be configured to collect repayment of a cash advance and fee that the merchant 402 received by deducting a portion of the merchant's earnings from financial transactions conducted by the merchant 402 from each business location 404, 406, and 408. The deduction can be done based on a rate of repayment, as described above. Further, the merchant financing system 412 can use the same rate of repayment for each of the merchant's 402 business locations 404, 406, and 408. For example, the merchant financing system 412 can deduct 10 percent from financial transactions conducted by the merchant 402 from the business location 404, 10 percent from financial transactions conducted by the merchant 402 from the business location 406, and 10 percent from financial transactions conducted by the merchant 402 from the business location 408.

Naturally, based on customer traffic, each business location 404, 406, and 408, may experience different amounts of financial transactions for purchases that were made at that business location. For example, the business location 404 may make sales that amount to $50,000 for a particular month while the business location 406 makes $20,000 in sales and the business location 408 makes $20,000 in sales. To ensure that the merchant 402 repays the cash advance and fee at a certain time, in some embodiments, the merchant financing system 412 is configured to adjust the rate of repayment for each of the merchant's 402 business locations 402, 406, and 408. That is the merchant financing system 412 can dynamically restructure the rate of repayment for each business location 404, 406, and 408 based on the merchant's respective earnings from financial transactions conducted from that business location.

For example, assuming the merchant financing system 412 was expecting to collect $14,000 from the merchant 402 during the particular month and, during the particular month, the business location 404 transacted $50,000 in sales while the business location 406 transacted $20,000 in sales and the business location 408 transacted $20,000 in sales. Using the same rate of repayment, e.g., 10 percent, for each business location 404, 406, and 408, the merchant financing system 412 will collect $5,000 from the business location 404, $2,000 from the business location 406, and $2,000 from the business location 408. Thus, the amount collected by the merchant financing system 412 totals $9,000, which is $5,000 short of what the merchant financing system 412 was expected to collect, i.e., $14,000. In this example, to ensure that the full $14,000 amount is able to be collected in the particular month, the merchant financing system 412 can dynamically increase the rate of repayment for the merchant's 402 business location 404 to 20 percent so that the merchant financing system 412 collects $10,000 from the merchant's earnings that were generated from the business location 404. The merchant financing system 412 can dynamically restructure the respective rate of repayment for each of the merchant's 402 business locations 404, 406, 408 on an on-going basis, e.g., daily, weekly, bi-weekly, monthly, or yearly.

As mentioned, the dynamic restructuring is typically based on a defined time period for completing the repayment of the cash advance and the fee. For example, the time period for repayment may be 10 months. If the rate of repayment is based on a percentage of the merchant's 402 earnings, then, naturally, the amount collected from the merchant 402 will vary depending on the number of financial transactions conducted by the merchant 402 and the amounts collected by the merchant through those financial transactions.

In some embodiments, to ensure that the merchant 402 repays the cash advance and fee in the defined time, the merchant financing system 412 evaluates the merchant's 402 earnings from each of the business locations 404, 406, and 408 at certain time periods or intervals, e.g., monthly.

If, after the evaluation, the merchant financing system 412 determines that the merchant 402 is not on track to repay the cash advance and fee in the defined time, then the merchant financing system 412 can dynamically increase the respective rates of repayment for the merchant's 402 business locations 404, 406, and 408 to ensure that the merchant 402 repays the amount due in the defined time.

If, however, after the evaluation the merchant financing system 412 determines that the merchant 402 is on track to repay the cash advance and fee before the defined time period ends, then the merchant financing system 412 can dynamically decrease the respective rates of repayment for the merchant's 402 business locations 404, 406, and 408 to ensure that the merchant 402 repays the amount due at the defined time. In some embodiments, the merchant financing system 402 dynamically reduces the merchant's respective rates of repayment when the merchant's 402 collective earnings from all business locations 404, 406, and 408 satisfy a threshold net percent value of the cash advance and fee.

In some instances, a merchant that is on track to repay the cash advance and fee before the defined time period may want to repay the cash advance and fee sooner than the defined time. In such instances, the merchant can instruct the merchant financing system 412 to continue collecting from the merchant's 402 financial transactions at the existing rates of repayment so that the merchant 402 is able to repay its obligations earlier than the defined time.

In some embodiments, if the merchant financing system 412 determines that the merchant 402 is on track to repay the cash advance and fee before the defined time period ends, the merchant financing system 412 notifies the merchant 402, for example, by an electronic communication, to request instructions from the merchant 402 on whether the merchant 402 wants to accept early repayment or a dynamic restructuring of the merchant's rates of repayment so that repayment occurs at the defined time.

In some embodiments, the merchant financing system 412 is configured to dynamically adjust the rates of repayment for a merchant in response to a determination that the merchant has repaid a threshold portion, e.g., 25 percent, of the cash advance and fee. For example, the merchant financing system 412 can dynamically decrease the rates of repayment for the merchant to reward the merchant for repaying the threshold portion of the cash advance and fee.

In some embodiments, the merchant financing system 412 is configured to provide the merchant with an offer for a new cash advance in response to a determination that the merchant has repaid the owed cash advance and fee. For example, the merchant financing system 412 can offer the merchant a new cash advance of a higher amount than the previous cash advance to reward the merchant for repaying the cash advance and fee.

Figure 5:
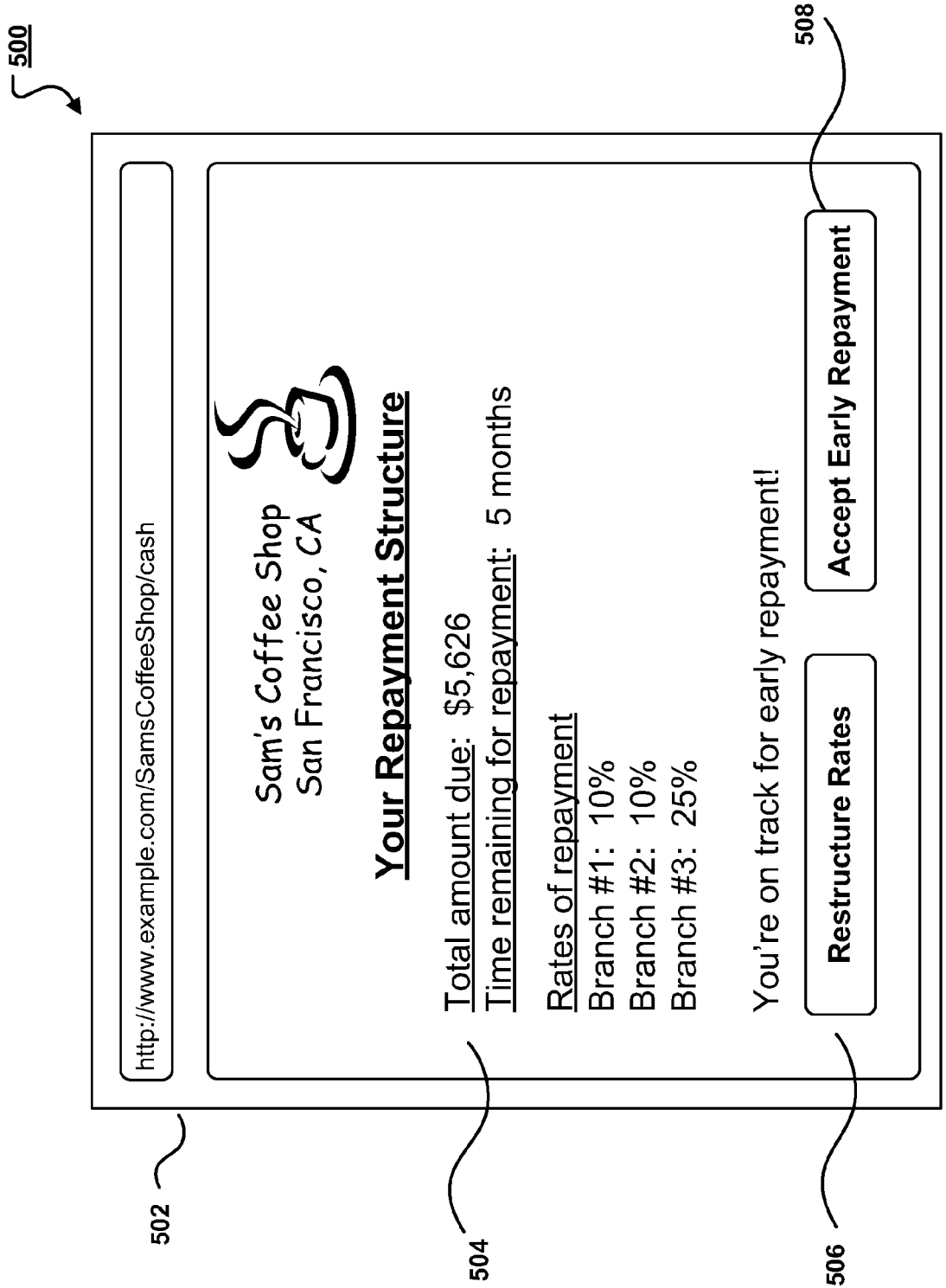
FIG. 5 illustrates example view of an interface for restructuring a repayment structure.

FIG. 5 illustrates example view 500 of an interface 502 for restructuring a repayment structure. The interface 502 is a graphical user interface that can be displayed on a display screen of a computing device that is being operated by a merchant ("Sam's Coffee Shop"). For example, the computing device, e.g., the merchant device 304, can present the interface 502 through an application, e.g., a web browser or a merchant application, that is running on the computing device. For example, the interface 502 may be accessible to the merchant over the Internet and through a secure Uniform Resource Locator (URL). In this example, the merchant can access the URL through a web browser to learn more about the financing offer. Similarly, the interface 502 may be accessible to the merchant through a software application, e.g., the merchant application, that is running on the computing device.

The interface 502 contains information that can be generated by the merchant financing system, e.g., the merchant financing system 308 or 412, using the approaches described in this specification. The merchant can interact with the computing device, e.g., the merchant device 304, to access the interface 502 and obtain information 504 about the merchant's repayment structure for a cash advance and its corresponding fee. The interface 502 indicates the total amount that is owed by the merchant for the cash advance and fee, the time period remaining for repayment of the cash advance and fee, and respective rates of repayment for different business locations of the merchant.

As described above, the merchant financing system is configured to determine whether the merchant is on track to repay its financial obligations, e.g., cash advance and fee, at a defined time. In some embodiments, the merchant financing system can notify the merchant, for example, through an electronic communication indicating that the merchant is on track to repay its financial obligations at an earlier date than the defined time. For example, the merchant may be doing so well financially that the merchant is on track to repay its financial obligation to the merchant financing system in 6 months rather than the defined time period of 10 months.

In such instances, in some embodiments, the merchant can access the interface 502 to select an option 506 for restructuring rates of repayment so that repayment of the merchant's financial obligation to the merchant financing system occurs at the defined time, i.e., 10 months, rather than the early repayment time period of 6 months. In response to this selection, the merchant financing system will reduce the rates of repayment for the merchant so that the merchant financing system deducts a lesser percentage or amount from the merchant's financial transactions. In some cases, rather than prolonging the repayment process, the merchant may want to complete repayment at the earlier repayment time period of 6 months. In such instances, the merchant can select an option 508 to instruct the merchant financing system to continue collecting from the merchant's financial transactions at the existing rates of repayment.

Figure 6:
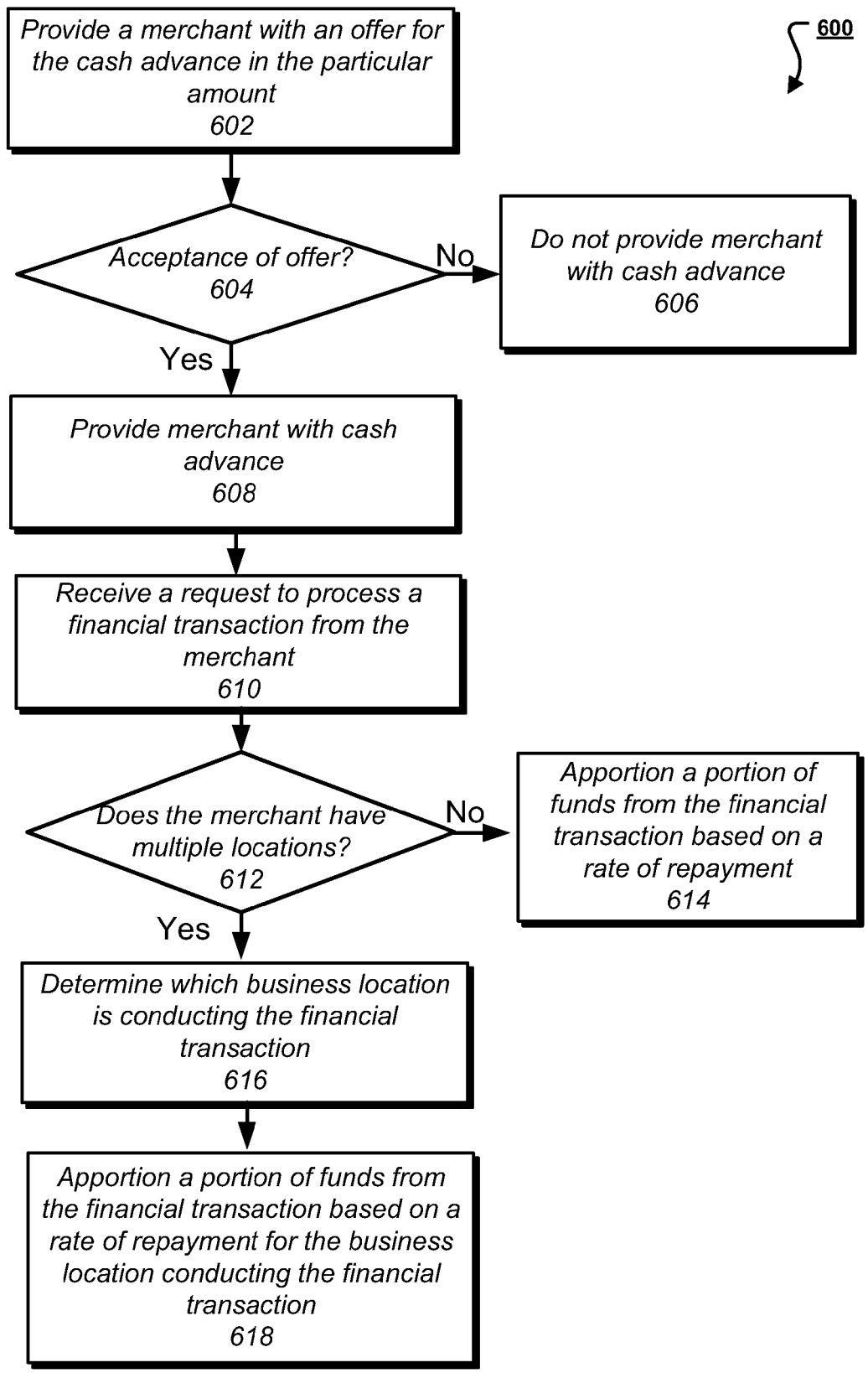
FIG. 6 illustrates an example process for collecting repayment from multiple business locations of a merchant.

FIG. 6 illustrates example process 600 for collecting repayment from multiple business locations of a merchant. The example process 600 is provided merely as an example and additional or fewer steps may be performed in similar or alternative orders, or in parallel, within the scope of the various embodiments described in this specification.

A computing system, e.g., the merchant financing system 308 or 412, as described above, provides a merchant with an offer for a cash advance 602. The offer can include terms for the cash advance that describe a repayment time, a fee for the cash advance, and respective rates of repayment for different business locations of the merchant. A determination is made if the merchant accepted the offer for the cash advance 604. If the merchant does not accept the offer for the cash advance, then no cash advance is provided to the merchant 606.

If the merchant accepts the offer, then the merchant is provided the cash advance. The cash advance can be provided through a payment system to a financial account of the merchant 608. The payment system can receive a request to process a financial payment transaction that was conducted by the merchant 610. A determination can be made as to whether the merchant has multiple business locations 612. If the merchant does not have multiple business locations, then the payment system apportions a portion of funds from the financial payment transaction to a separate financial account of the payment system based on the rate for repayment that was assigned to the merchant 614.

If the merchant has multiple business locations, then the payment system determines at which business location is the financial transaction being conducted 616. The payment system can obtain a rate of repayment that was assigned to the business location at which the financial transaction is being conducted. The payment system then apportions a portion of funds from the financial payment transaction being conducted at the business location to a separate financial account of the payment system based on a rate for repayment that was assigned to the business location of the merchant 618.

Figure 7:
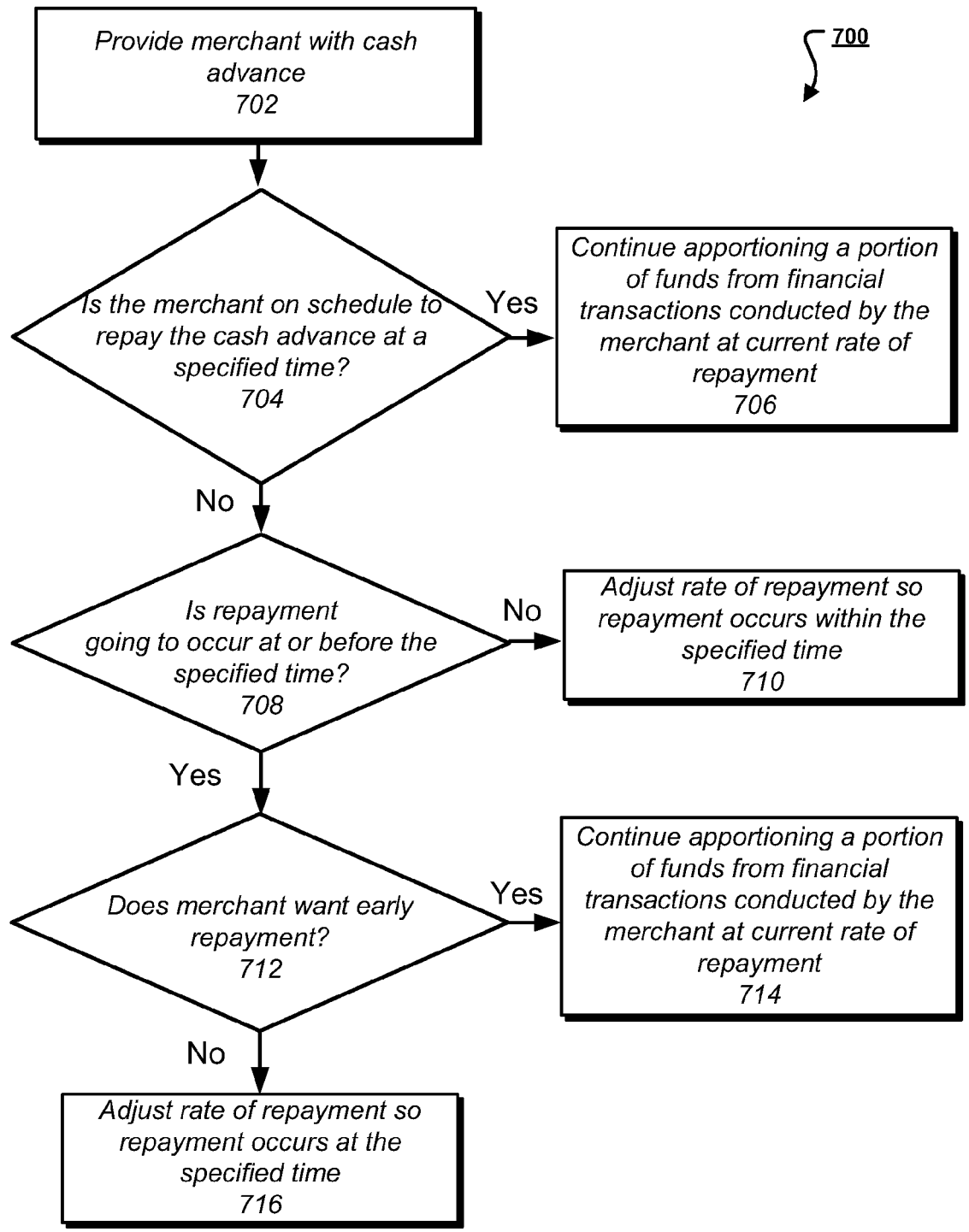
FIG. 7 illustrates an example process for dynamic restructuring of repayment for a merchant.

FIG. 7 illustrates an example process 700 for restructuring rates of repayment for a merchant. The example process 700 is provided merely as an example and additional or fewer steps may be performed in similar or alternative orders, or in parallel, within the scope of the various embodiments described in this specification.

A computing system, e.g., the merchant financing system 308 or 412, as described above, provides a merchant with a cash advance 702. The cash advance can be associated with a fee, a rate of repayment, and a time period for repayment of the cash advance and fee. The computing system can evaluate financial transactions that are conducted by the merchant through the computing system to determine whether the merchant is on track to repay the cash advance within the time period for repayment 704. If a determination is made that the merchant is on track to repay the cash advance and the fee at the time, then the computing system continues apportioning a portion of funds from financial transactions conducted by the merchant at the rate of repayment 706. As mentioned, the apportioned funds are applied to repayment of the cash advance and fee.

If the merchant is not on track to repay the cash advance and fee at the time period for repayment, then a determination is made whether the repayment is going to occur at or before the specified time period for repayment 708. If the merchant is going to take longer than the specified time period to repay the cash advance and fee, then the computing system adjusts the rate of repayment so that repayment occurs at the specified time period 710.

If the merchant is going to repay before the specified time, a determination is made as to whether the merchant wants to complete repayment before the specified time period 712. If the merchant wants to complete repayment before the specified time, then the computing system continues apportioning a portion of funds from financial transactions conducted by the merchant at the rate of repayment 714. If, however, the merchant wants the repayment to occur at the specified time, then the computing system adjusts the rate of repayment so that repayment occurs at the specified time period 716.

Figure 8:
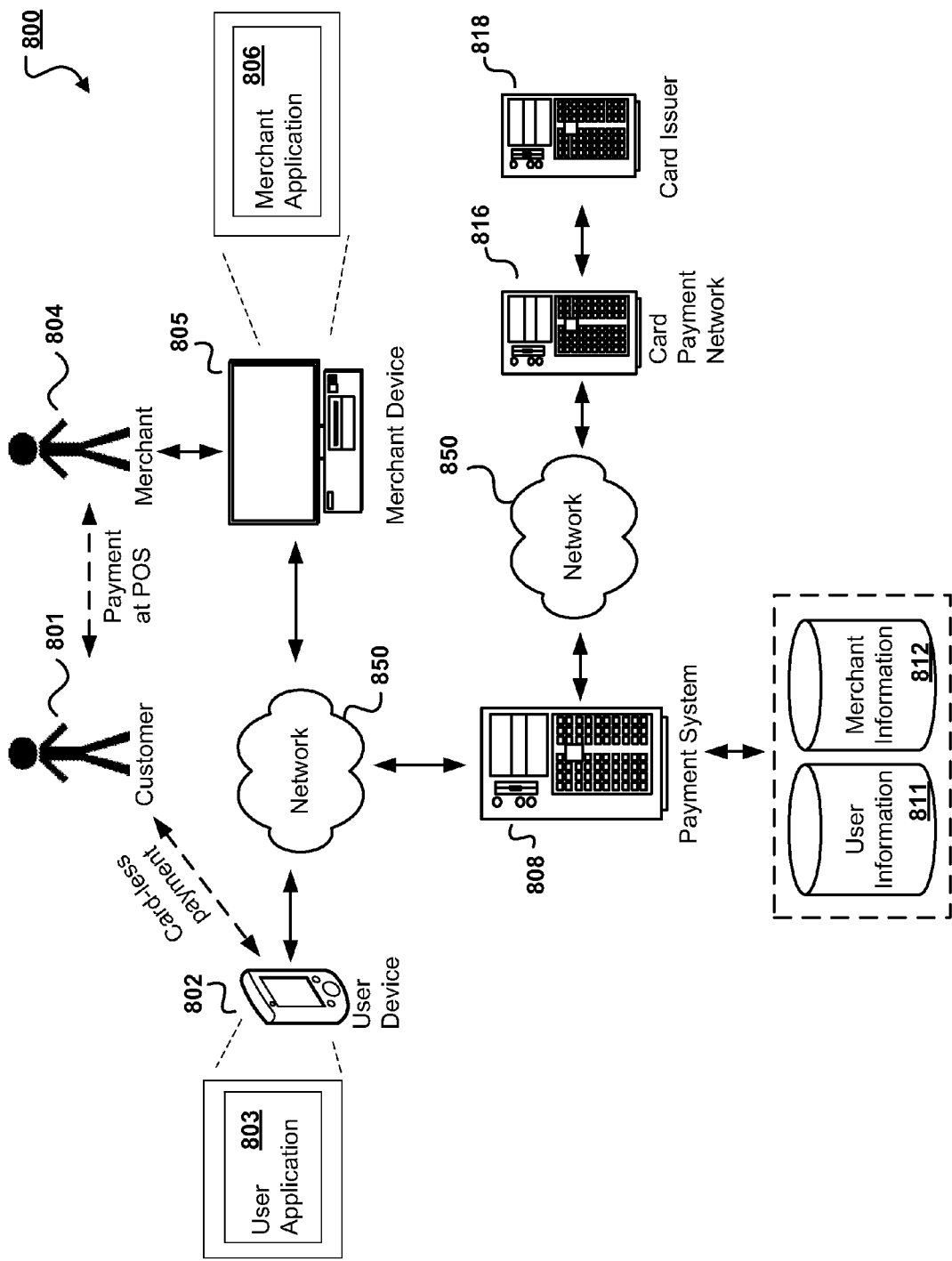
FIG. 8 illustrates an example of an environment for implementing a payment system.

FIG. 8 illustrates an example of an environment 800 for implementing a payment system 808. Although a mobile device environment is described for purposes of explanation, different environments may be used, e.g., a web-based environment, to implement various embodiments.

The example environment 800 includes a payment system 808, e.g., the payment system 312, as described above, which can be implemented as computer programs on one or more computers in one or more locations, in which the systems, components, and techniques described below can be implemented. The example environment 800 also includes a user device 802 and a merchant device 805.

The user device 802 and the merchant device 805 can each be a computer coupled to the payment system 808 through a data communication network 850, e.g., the Internet. The user device 802 and the merchant device 805 each generally include a memory, e.g., a random access memory (RAM), for storing instructions and data, and a processor for executing stored instructions. The user device 802 and the merchant device 805 can each include one or more components, e.g., software or hardware, that are configured to respectively determine a geographic location of the user device 802 or the merchant device 805, using, for example, various geolocation techniques, e.g., a global positioning system (GPS). Further, the user device 802 and the merchant device 805 can each be any appropriate device operable to send and receive requests, messages, or other types of information over the network 850. Some examples of user devices include personal computers, cellular phones, handheld messaging devices, laptop computers, personal data assistants, tablet devices, and the like.

The network 850 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The payment system 808, the merchant device 805, and the user device 802 can communicate over the network using wired or wireless connections, and combinations thereof.

As used in this specification, a financial transaction is a transaction that is conducted between a customer 801 and a merchant 804 at a point-of-sale. When paying for a financial transaction, the customer 801 can provide the merchant 804 with cash, a check, or credit card for the amount that is due. The merchant 804 can interact with a point-of-sale device, e.g., merchant device 805, to process the financial transaction. During financial transactions, the point-of-sale device can collect data describing the financial transaction, including, for example, the amount of payment received from customers.

In some implementations, the payment system 808 is configured to accept card-less payment transactions from customers, e.g., the customer 801. As used in this specification, a card-less payment transaction is a transaction conducted between the customer 801 and a merchant 804 at the point-of-sale during which a financial account of the customer 801 is charged without the customer 801 having to physically present a financial payment card to the merchant 804 at the point-of-sale. That is, the merchant 804 need not receive any details about the financial account, e.g., the credit card issuer or credit card number, for the transaction to be processed.

Before conducting card-less payment transactions, the customer 801 typically creates a user account with the payment system 808. The customer 801 can create the user account, for example, by interacting with a user application 803 that is configured to perform card-less payment transactions and that is running on the user device 802. When creating a user account with the payment system 808, the customer 801 will provide portrait of the customer 801, data describing a financial account of the customer 801, e.g., credit card number, expiration date, and a billing address. This user information can be securely stored by the payment system 808, for example, in a user information database 811. To accept card-less payment transactions, the merchant 804 typically creates a merchant account with the payment system 808 by providing information describing the merchant including, for example, a merchant name, contact information, e.g., telephone numbers, the merchant's geographic location address, and one or more financial accounts to which funds collected from users will be deposited. This merchant information can be securely stored by the payment system 808, for example, in a merchant information database 812.

The payment system 808 is configured to perform card-less payment transactions. The payment system 808 can include one or more servers that are configured to securely perform electronic financial transactions, e.g., electronic payment transactions, between a customer and a merchant, for example, through data communicated between the user device 802 and the merchant device 805. Generally, when a customer and a merchant enter into an electronic financial transaction, the transaction is processed by transferring funds from a financial account associated with the user account to a financial account associated with the merchant account.

The payment system 808 is configured to send and receive data to and from the user device 802 and the merchant device 805. For example, the payment system 808 can be configured to send data describing merchants to the user device 802 using, for example, the information stored in the merchant information database 812. For example, the payment system 808 can communicate data describing merchants that are within a threshold geographic distance from a geographic location of the user device 802, as described in this specification. The data describing merchants can include, for example, a merchant name, geographic location, contact information, and an electronic catalogue, e.g., a menu, that describes items that are available for purchase from the merchant.

In some embodiments, the payment system 808 is configured to determine whether a geographic location of the user device 802 is within a threshold geographic distance from a geographic location of the merchant device 805. The payment system 808 can determine a geographic location of the user device 802 using, for example, geolocation data provided by the user device 802. Similarly, the payment system 808 can determine a geographic location of the merchant device 805 using, for example, geolocation data provided by the merchant device 805 or using a geographic address, e.g., street address, provided by the merchant. Depending on the implementation, the threshold geographic distance can be specified by the payment system 808 or by the merchant.

Determining whether the user device 802 is within a threshold geographic distance of the merchant device 805 can be accomplished in different ways including, for example, determining whether the user device 802 is within a threshold geographic radius of the merchant device 805, determining whether the user device 802 is within a particular geofence, or determining whether the user device 802 can communicate with the merchant device 805 using a specified wireless technology, e.g., Bluetooth or Bluetooth low energy (BLE). In some embodiments, the payment system 808 restricts card-less payment transactions between the customer 801 and the merchant 804 to situations where the geographic location of the user device 802 is within a threshold geographic distance from a geographic location of the merchant device 805.

The payment system 808 can also be configured to communicate with a computer system 816 of a card payment network, e.g., Visa or MasterCard, over the network 850, or over a different network, for example, to conduct electronic financial transactions. The computer system 816 of the card payment network can communicate with a computer system 818 of a card issuer, e.g., a bank. There may be computer systems of other entities, e.g., the card acquirer, between the payment system 808 and the computer system 818 of the card issuer.

The customer 801 operating the user device 802 that is within a threshold geographic distance of the merchant 804 can interact with a user application 803 running on the user device 802 to conduct a card-less payment transaction with the merchant 804. While interacting with the user application 803, the customer 801 can select the merchant 804, from a listing of merchants, with whom the customer 801 wants to enter into a card-less payment transaction. The user can select the merchant 804, for example, by selecting a "check in" option associated with the merchant 804. The user device 802 can communicate data to the payment system 808 indicating that the customer 801 has checked in with the merchant 804. In response, the payment system 808 can communicate data to notify the merchant device 805 that the user has checked in. A merchant application 806 running on the merchant device 805 can notify the merchant 804 that the user has electronically checked in with the merchant 804 through a display screen of the merchant device 805.

Once checked in, the customer 801 can collect, or request, items that are available for purchase from the merchant 804. When the customer 801 is ready to enter into the card-less payment transaction, the customer 801 can, for example, approach a point-of-sale for the merchant 804 and identify him or herself. For example, the customer 801 can verbally notify the merchant 804 that the customer 801 wants to enter into a card-less payment transaction and can provide the merchant 804 with the customer's name. The merchant 804 can then interact with the merchant application 806 to select the customer 801, from a listing of customers that have checked in with the merchant 804, to initiate a card-less payment transaction for the items being purchased by the customer 801. For example, the merchant 804 can determine a total amount to bill the customer 801 for the items being purchased. The customer 801 can verbally approve the total amount to be billed and, in response, the merchant 804 can submit a request for a card-less payment transaction for the total amount to the payment system 808. In response, the payment system 808 can obtain, for example, from the user information database 811, data describing a financial account associated with a user account of the customer 801 to which the total amount will be billed.

The payment system 808 can then communicate with the computer system 816 of a card payment network to complete an electronic financial transaction for the total amount to be billed to the customer's financial account. Once the electronic financial transaction is complete, the payment system 808 can communicate data describing the card-less payment transaction to the user device 802, e.g., an electronic receipt, which can, for example, notify the customer 801 of the total amount billed to the user for the card-less payment transaction with the particular merchant.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   receiving, by one or more server computing devices of a payment and financing system, from a plurality of merchant computing devices associated with a plurality of merchants, transaction information of transactions performed between the plurality of merchants and a plurality of customers, each merchant computing device having a respective instance of a merchant application installed thereon for configuring the merchant computing device as a point-of-sale device, the merchant application further configuring the merchant computing device to communicate the transaction information over a network to the one or more server computing devices;
   comparing, by the one or more server computing devices, the transaction information received from the plurality of merchant computing devices with one or more factors associated with respective ones of the plurality of merchants to generate a custom financing offer for a first merchant of the plurality of merchants, wherein the first merchant is associated with a first merchant computing device;
   providing, by the one or more server computing devices, the custom financing offer for a cash advance to the first merchant computing device, the custom financing offer including terms for the cash advance that describe a repayment time, a fee for the cash advance, and a rate of repayment;

receiving, by the one or more server computing devices, from the first merchant computing device used to conduct transactions between the first merchant and customers of the first merchant, an acceptance of the custom financing offer for the cash advance;

providing, by the one or more server computing devices, the cash advance to a financial account of the first merchant with a financial institution, wherein the financial institution and the payment and financing system are separate entities;

performing, by the one or more server computing devices, subsequent to providing the cash advance, payment processing for a plurality of transactions conducted with customers of the first merchant via the first merchant computing device;

deducting, by the one or more server computing devices, a portion of funds from the plurality of transactions for repayment of the cash advance and the fee;

determining, by the one or more server computing devices, based on the payment processing for the plurality of transactions conducted with the customers of the first merchant via the first merchant computing device, first merchant transaction information indicating that the first merchant is not on schedule for repaying the cash advance and the fee within the repayment time;

determining, by the one or more server computing devices, based on the first merchant transaction information, a set of adjusted terms for repayment of the cash advance and the fee for the cash advance, the set of adjusted terms including at least an adjusted rate of repayment of the cash advance and the fee, the terms being adjusted so that the first merchant is on schedule for repaying the cash advance and the fee for the cash advance within the repayment time; and deducting, by the one or more server computing devices, a portion of funds from future transactions between the first merchant and customers of the first merchant, conducted using the first merchant device through the payment and financing system, for repayment of the cash advance and the fee, the portion of funds deducted from the future transactions being based on the adjusted rate of repayment of the cash advance determined based on the first merchant transaction information.

2. The computer-implemented method of claim 1, further comprising:

evaluating, by the one or more server computing devices, additional transaction information for another plurality of transactions conducted between the first merchant and another plurality of customers, that was received from the first merchant computing device for payment processing by the payment and financing system;

determining, based on the additional transaction information, that the first merchant is ahead of schedule for repaying the cash advance and the fee within the repayment time; and determining, by the one or more server computing devices, a next set of adjusted terms for repayment of the cash advance and the fee, the next set of adjusted terms including a next adjusted rate of repayment of the cash advance and the fee, so that the first merchant is on schedule for repaying the cash advance and the fee within the repayment time.

3. The computer-implemented method of claim 1, further comprising:

evaluating, by the one or more server computing devices, additional transaction information for another plurality of transactions conducted between first the merchant and another plurality of customers, that was received from the first merchant computing device for payment processing by the payment and financing system;

determining, by the one or more server computing devices, that the first merchant has repaid the cash advance and the fee before the repayment time; and providing, by the one or more server computing devices, to the first merchant computing device, another custom financing offer for a second cash advance.

4. The computer-implemented method of claim 1, further comprising:

evaluating, by the one or more server computing devices, additional transaction information for another plurality of transactions conducted between the first merchant and another plurality of customers, that was received from the first merchant computing device for payment processing by the payment and financing system;

determining, by the one or more server computing devices, based on the additional transaction information, that the first merchant is ahead of schedule for repaying the cash advance and the fee within the repayment time; and sending, by the one or more server computing devices, a notification to a first merchant computing device of the first merchant indicating that the first merchant is ahead of schedule for repayment of the cash advance and the fee.

5. The computer-implemented method of claim 4, further comprising:

receiving, by the one or more server computing devices, from the first merchant computing device of the first merchant, instructions for dynamically restructuring the rate of repayment for the cash advance and the fee for the cash advance so that the repayment completes within the repayment time; and based on the instructions, changing by the one or more server computing devices, an amount deducted from subsequent transactions processed by the payment and financing system between the first merchant and customers using the first merchant computing device.

6. A payment and financing system comprising:

one or more processors; and one or more computer-readable media storing instructions that, when executed by the one or more processors of the payment and financing system, cause the one or more processors to perform operations comprising:

receiving, by the one or more processors, from a plurality of merchant computing devices associated with a plurality of merchants, transaction information of transactions performed between the plurality of merchants and a plurality of customers, each merchant computing device having a respective instance of a merchant application installed thereon for configuring the merchant computing device as a point-of-sale device, the merchant application further configuring the merchant computing device to communicate the transaction information over a network to the one or more processors;

comparing, by the one or more processors, the transaction information received from the plurality of merchant computing devices with one or more factors associated with respective ones of the plurality of merchants to generate a custom financing offer for a first merchant of the plurality of merchants, wherein the first merchant is associated with a first merchant computing device;

providing, by the one or more processors, the custom financing offer for a cash advance to the first merchant computing device, the custom financing offer including terms for the cash advance that describe a repayment time, a fee for the cash advance, and a rate of repayment;

receiving, by the one or more processors, from the first merchant computing device used to conduct transactions between the first merchant and customers of the first merchant, an acceptance of the custom financing offer for the cash advance;

providing, by the one or more processors, the cash advance to a financial account of the first merchant with a financial institution, wherein the financial institution and the payment and financing system are separate entities;

performing, by the one or more processors, subsequent to providing the cash advance, payment processing for a plurality of transactions conducted with customers of the first merchant via the first merchant computing device;

deducting, by the one or more processors, a portion of funds from the plurality of transactions for repayment of the cash advance and the fee;

determining, by the one or more processors, based on the payment processing for the plurality of transactions conducted with the customers of the first merchant via the first merchant computing device, first merchant transaction information indicating that the first merchant is not on schedule for repaying the cash advance and the fee within the repayment time;

determining, by the one or more processors, based on the first merchant transaction information, a set of adjusted terms for repayment of the cash advance and the fee for the cash advance, the set of adjusted terms including at least an adjusted rate of repayment of the cash advance and the fee, the terms being adjusted so that the first merchant is on schedule for repaying the cash advance and the fee for the cash advance within the repayment time; and deducting, by the one or more processors, a portion of funds from future transactions between the first merchant and customers of the first merchant, conducted using the first merchant device through the payment and financing system, for repayment of the cash advance and the fee, the portion of funds deducted from the future transactions being based on the adjusted rate of repayment of the cash advance determined based on the first merchant transaction information.

7. The payment and financing system as recited in claim 6, the operations further comprising:

evaluating, by the one or more processors, additional transaction information for another plurality of transactions conducted between the first merchant and another plurality of customers, that was received from the first merchant computing device for payment processing by the payment and financing system;

determining, by the one or more processors, based on the additional transaction information, that the first merchant is ahead of schedule for repaying the cash advance and the fee within the repayment time; and determining, by the one or more processors, a next set of adjusted terms for repayment of the cash advance and the fee, the next set of adjusted terms including a next adjusted rate of repayment of the cash advance and the fee, so that the first merchant is on schedule for repaying the cash advance and the fee within the repayment time.

8. The payment and financing system as recited in claim 6, the operations further comprising:

evaluating, by the one or more processors, additional transaction information for another plurality of transactions conducted between first the merchant and another plurality of customers, that was received from the first merchant computing device for payment processing by the payment and financing system;

determining, by the one or more processors, that the first merchant has repaid the cash advance and the fee before the repayment time; and providing, by the one or more processors, to the first merchant computing device, another custom financing offer for another cash advance.

9. The payment and financing system as recited in claim 6, the operations further comprising:

evaluating, by the one or more processors, additional transaction information for another plurality of transactions conducted between the first merchant and another plurality of customers, that was received from the first merchant computing device for payment processing by the payment and financing system;

determining, by the one or more processors, based on the additional transaction information, that the first merchant is ahead of schedule for repaying the cash advance and the fee within the repayment time; and sending, by the one or more processors, a notification to a first merchant computing device of the first merchant indicating that the first merchant is ahead of schedule for repayment of the cash advance and the fee.

10. The payment and financing system as recited in claim 9, the operations further comprising:

receiving, by the one or more processors, from the first merchant computing device of the first merchant, instructions for dynamically restructuring the rate of repayment for the cash advance and the fee for the cash advance so that the repayment completes within the repayment time; and based on the instructions, changing, by the one or more processors, an amount deducted from subsequent transactions processed by the payment and financing system between the first merchant and the customers using the first merchant computing device.

11. A system comprising:

one or more processors; and one or more computer-readable media storing instructions that, when executed by the one or more processors of a payment and financing system, cause the one or more processors to perform operations comprising:

receiving, by the one or more processors, from a plurality of merchant computing devices associated with a plurality of merchants, transaction information of transactions performed between the plurality of merchants and a plurality of customers, each merchant computing device having a respective instance of a merchant application installed thereon for configuring the merchant computing device as a point-of-sale device, the merchant application further configuring the merchant computing device to communicate the transaction information over a network to the one or more processors;

comparing, by the one or more processors, the transaction information received from the plurality of merchant computing devices with one or more factors associated with respective ones of the plurality of merchants to generate a custom financing offer for a first merchant of the plurality of merchants, the custom financing offer including terms for a cash advance and a repayment time;

sending, by the one or more processors, to a first merchant computing device associated with the first merchant, the custom financing offer for presentation on a user interface on the first merchant computing device;

in response to an indication of acceptance of the custom financing offer, providing, by the one or more processors, the cash advance to a financial account of the first merchant with a financial institution;

subsequent to providing the cash advance, deducting, by the one or more processors, for repayment of the cash advance, a portion of funds from a plurality of transactions conducted between customers and the first merchant via the first merchant computing device;

subsequent to providing the cash advance, determining, by the one or more processors, based on the plurality of transactions conducted between the customers and the first merchant via the first merchant computing device, that the first merchant is ahead of schedule for repaying the cash advance and within the repayment time; and sending, by the one or more processors, a notification to the first merchant computing device indicating that the first merchant is ahead of schedule for repayment of the cash advance.

12. The system as recited in claim 11, further comprising:

receiving, by the one or more processors, from the first merchant computing device, instructions for dynamically restructuring the rate of repayment for the cash advance so that the repayment completes within the repayment time; and based on the instructions, changing, by the one or more processors, an amount deducted from subsequent transactions processed by the payment and financing system between the first merchant and the customers using the first merchant computing device.

13. The system as recited in claim 11, further comprising:

determining, by the one or more processors, that the first merchant has repaid the cash advance before the repayment time; and providing, by the one or more processors, to the first merchant computing device, another custom financing offer for another cash advance.

14. The system as recited in claim 11, further comprising:

receiving, by the one or more processors, from the first merchant computing device, instructions for dynamically restructuring the rate of repayment for the cash advance so that the repayment completes within the repayment time;

determining, by the one or more processors, based on the first merchant transaction information, a set of adjusted terms for repayment of the cash advance, the set of adjusted terms including at least an adjusted rate of repayment of the cash advance; and deducting, by the one or more processors, based on the adjusted rate of repayment, a portion of funds from future transactions between the first merchant and customers of the first merchant conducted using the first merchant device.

15. The system as recited in claim 14, further comprising:

evaluating, by the one or more processors, additional transaction information for another plurality of transactions conducted between the first merchant and another plurality of customers;

determining, based on the additional transaction information, that the first merchant is not on schedule for repaying the cash advance within the repayment time; and determining, by the one or more processors, a next adjusted rate of repayment of the cash advance and the fee, so that the first merchant is on schedule for repaying the cash advance and the fee within the repayment time.

\* \* \* \* \*